United States Patent [19]

Socha

[11] 4,342,271
[45] Aug. 3, 1982

[54] STITCH LENGTH RANGE INDICATING ARRANGEMENT IN A MULTIPLE PATTERN SEWING MACHINE

[75] Inventor: Robert J. Socha, Elizabeth, N.J.

[73] Assignee: The Singer Company, Stamford, Conn.

[21] Appl. No.: 292,462

[22] Filed: Aug. 13, 1981

[51] Int. Cl.³ .................. D05B 3/02; D05B 79/00
[52] U.S. Cl. .................... 112/158 E; 112/158 F; 112/315
[58] Field of Search .......... 112/158 E, 158 F, 158 A, 112/158 D, 158 R, 315, 314

[56] References Cited

U.S. PATENT DOCUMENTS 4,064,817 12/1977 Sawada et al. ............... 112/158 F
4,236,467 12/1980 Tanaka et al. ............... 112/158 F X
4,270,472 6/1981 Suzuki et al. ................ 112/158 E

FOREIGN PATENT DOCUMENTS 53-163144 12/1979 Japan .
55-50391 4/1980 Japan ........................... 112/158 E

*Primary Examiner*—Peter P. Nerbun
*Attorney, Agent, or Firm*—David L. Davis; Robert E. Smith; Edward L. Bell

[57] ABSTRACT

An arrangement for indicating to an operator whether a selected stitch length is within, below or above a preferred range for a selected pattern in a multiple pattern sewing machine includes a slide contact board and a group of slide contacts connected to a stitch length selection lever. The different patterns are grouped in accordance with preferred stitch length ranges, each group having associated therewith one of the slide contacts on the lever. The slide contact board is arranged to define the preferred ranges so that for each of the pattern groups, a circuit is completed to energize a low LED if the selected stitch length is below the preferred range; to energize an in-range LED if the selected stitch length is within the preferred range; and to energize the high LED if the selected stitch length is above the preferred range.

7 Claims, 4 Drawing Figures

STITCH LENGTH RANGE INDICATING ARRANGEMENT IN A MULTIPLE PATTERN SEWING MACHINE

DESCRIPTION

BACKGROUND OF THE INVENTION

This invention relates to sewing machines and, more particularly, to an arrangement adapted for use in a multiple pattern sewing machine for providing an indication as to when an operator selected stitch length is within a preferred range of stitch lengths for the pattern selected to be sewn.

When operating a multiple pattern sewing machine, the operator often desires to be able to adjust the stitch length. Accordingly, sewing machines are typically provided with a stitch length adjusting arrangement. In a mechanically controlled sewing machine, such adjustment may be in the form of linkages coupled to an operator manipulable member, such as a lever or dial. In an electronically controlled sewing machine, stitch length adjustment may be effected by setting a potentiometer, for example. In any event, there is a wide range of stitch lengths which are available. However, every pattern has a preferred range of stitch lengths. For example, while there may be one preferred range of stitch lengths when sewing a straight stitch, there may be another preferred range of stitch lengths when sewing a zig zag or basting stitch. It would be desirable to be able to indicate to the operator the preferred range of stitch lengths for the selected pattern without requiring the operator to refer to a users manual.

It is therefore an object of this invention to provide an arrangement for assisting an operator in selecting a stitch length within a preferred range of stitch lengths for the pattern which has been selected to be sewn.

SUMMARY OF THE INVENTION

The foregoing and additional objects are attained in accordance with the principles of this invention in a multiple pattern sewing machine having means for operator selection of a pattern to be sewn and operator influenced means for adjusting the relative stitch lengths within a selected pattern by providing means for defining a preferred range of relative stitch lengths for each of the patterns, indicator means for communicating with an operator, the indicator means including at least a first indicating element which is selectively energizable to assume an operator perceivable state, and control means responsive to pattern and stitch length selection for controlling the indicator means, the control means responding to a selected stitch length within the selected pattern preferred range for energizing the first indicating element.

In accordance with an aspect of this invention, the indicator means further includes a second and a third indicating element and the control means further responds to a selected stitch length being outside of and below the selected pattern preferred range for energizing the second indicating element and to a selected stitch length being outside of and above the selected pattern preferred range for energizing the third indicating element.

BRIEF DESCRIPTION OF THE DRAWINGS

The foregoing will be more readily apparent upon reading the following description in conjunction with the drawings wherein.

DETAILED DESCRIPTION

Figure 1:
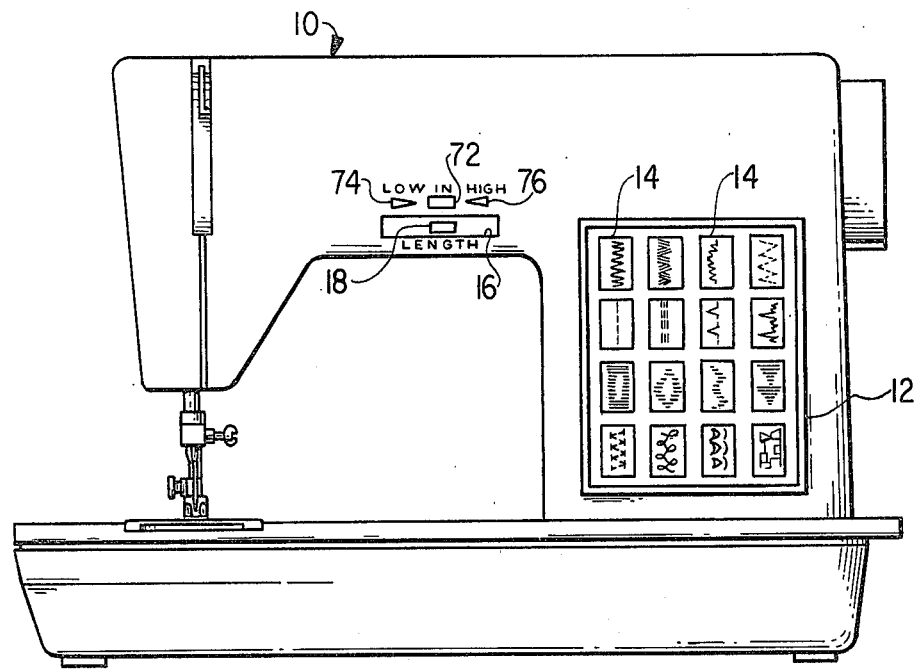
FIG. 1 is a front elevational view of a multiple pattern sewing machine including an arrangement constructed in accordance with the principles of this invention.

Referring now to the drawings, wherein like elements in different figures thereof have the same reference character applied thereto, FIG. 1 illustrates a sewing machine designated generally by the reference numeral 10 which includes an arrangement constructed in accordance with the principles of this invention. The sewing machine 10 is a multiple pattern sewing machine including a pattern selection panel 12. The sewing machine 10 may be a mechanically controlled sewing machine in which case the buttons 14 on the panel 12 select appropriate pattern cams or, alternatively, the sewing machine 10 may be an electronically controlled sewing machine in which case the buttons 14 activate pattern selection switches or the like for pattern selection, as is well known in the art. It is to be understood that the present invention is adpated for use with either type of multiple pattern sewing machine.

Figure 2:
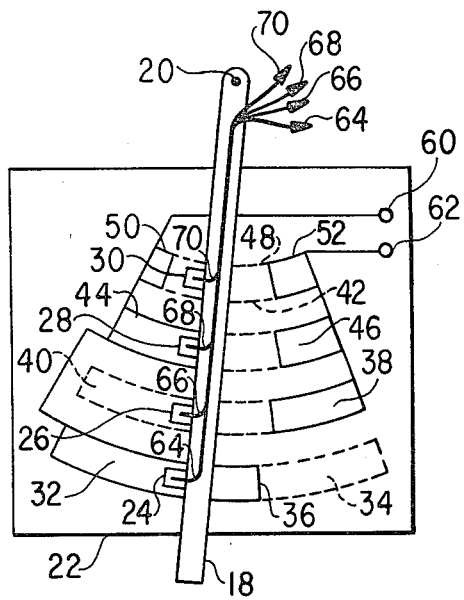
FIG. 2 is a top view of a stitch length selection lever and a slide contact board which defines the preferred ranges of stitch length.

The sewing machine 10 also includes an arrangement whereby the operator may adjust the relative stitch length within a selected pattern, as is well known in the art. Illustratively, this arrangement includes a slot 16 formed in the sewing machine and a lever 18 which extends through the slot 16. As shown in FIG. 2, the lever 18 is pivoted at 20. Although not shown in the drawings, the lever 18 may be connected via linkages to a conventional mechanical feed regulator or via the wiper arm of a potentiometer to an electronically controlled feed override arrangement. In any event, the lever 18 utilized to adjust the stitch length is arranged for planar pivotal movement about the point 20 within a range of positions. Parallel to the plane of movement of the lever 18 there is provided a slide contact board 22. Illustratively, the patterns which may be sewn by the sewing machine 10 are divided into four groups in accordance with preferred ranges of stitch lengths, all of the patterns within a group having the same preferred range. Accordingly, for each group of patterns there is provided a respective wiper contact member 24, 26, 28 and 30, mounted on the lever 18 at different distances from the pivot point 20. Although a lever has been illustrated as constituting the operator manipulable stitch length adjustment element, it is understood that other elements, such as for example a wheel, may be utilized while still remaining within the scope of this invention.

Disposed on the surface of the contact board 22 there is provided a plurality of areas of electrically conductive material. As shown in FIG. 2, these areas are shaped as arcuate segments which lie beneath the circular paths of travel of the contact members 24–30. As will become apparent from the following discussion, the conductive areas are arranged on the surface of the board 22 so that a contact member on the lever 18 does not touch a conductive area when the lever 18 is set for a stitch length within the preferred range for the pattern corresponding to that contact member. When the lever 18 is set to a stitch length below the preferred range, the contact member for that pattern contacts a conductive area on the left side of the board 22. Similarly, when the lever 18 is set to a stitch length above the preferred range for the selected pattern, the corresponding contact member contacts a conductive area on the right side of the board 22. Thus, for the contact member 24 there is provided a conductive area 32 and a non-conductive area 34, indicating that the preferred range of stitch lengths for the group of patterns corresponding to the contact member 24 is any stitch length above a value where the lever 18 is positioned so that the contact member 24 is at the point 36 intermediate the areas 32 and 34. Similarly, for the contact member 26 there is provided a conductive area 38 and a non-conductive area 40, indicating that the preferred range of stitch lengths of patterns corresponding to the contact member 26 lies below some value. For the contact member 28 there is provided a non-conductive area 42 defining the preferred range of stitch lengths for the patterns corresponding to the contact member 28, a conductive area 44 corresponding to stitch lengths below the preferred range, and a conductive area 46 corresponding to stitch lengths above the preferred range. Similarly, for the contact member 30 there is provided a non-conductive area 48 corresponding to a preferred range of stitch lengths, a conductive area 50 corresponding to stitch lengths below the preferred range and a conductive area 52 corresponding to stitch lengths above the preferred range. As shown in FIG. 2, the conductive areas 32, 44 and 50, which all correspond to stitch lengths below the preferred ranges, are electrically connected together and are coupled to the terminal 60 and the conductive areas 38, 46 and 52, which all correspond to stitch lengths above the preferred ranges, are also electrically connected together and are coupled to the terminal 62. Additionally, each of the contact members 24, 26, 28 and 30 is connected to a respective wire 64, 66, 68 and 70.

Figure 3:
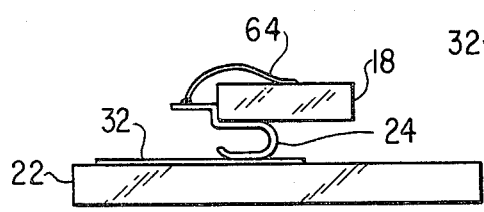
FIG. 3 is an enlarged end view of the lever and board of FIG. 2.

FIG. 3 is an enlarged end view showing how the contact member 24 is mounted on the lever 18 and also showing the relationships between the lever 18, the contact member 24, the board 22 and the conductive area 32.

Referring momentarily back to FIG. 1, on the sewing machine 10 above the slot 16 there is provided indicator means for communicating with the sewing machine operator as to whether the selected stitch length is within the preferred range for the selected pattern. This indicator means includes an indicating element 72, illustratively a light emitting element, which is energized when the selected stitch length is within the preferred range, an indicating element 74 which is energized when the selected stitch length is below the preferred range, and an indicating element 76 which is energized when the selected stitch length is above the preferred range.

Figure 4:
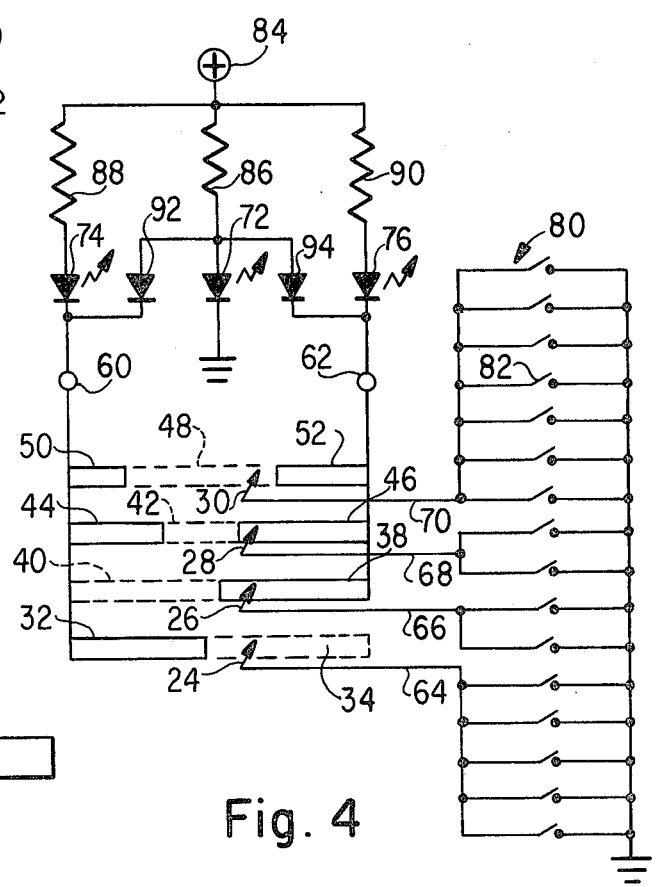
FIG. 4 is a schematic diagram of circuitry for controlling the indicating elements in accordance with the selected pattern and stitch length.

Referring now to FIG. 4, shown therein is illustrative circuitry for controlling the energization of the elements 72, 74 and 76 in accordance with the position of the lever 18 and the selected pattern. As was discussed previously, the patterns are divided into different groups corresponding to different preferred ranges of stitch lengths. Accordingly, there is provided a bank of switches 80, each of which corresponds to one of the pattern selection buttons 14 and each of which is closed when its corresponding pattern selection button 14 is actuated to select a pattern corresponding to that button. Illustratively, the patterns are divided into four groups. Thus, for example, the first group of patterns includes five patterns, each of which has one side of their respective switches connected to the wiper arm 24 via the lead 64; the second group of patterns includes two patterns, each of which has one side of their switches connected to the wiper element 26 via the lead 66; the third group of patterns includes two patterns, each of which has one side of their respective switches connected to the wiper element 28 via the lead 68; and the fourth group of patterns includes seven patterns, each of which has one side of their switches connected to the wiper element 30 via the lead 70. The second side of all of the switches in the bank 80 is connected to electrical ground. To understand the operation of the aforedescribed arrangement, it is assumed that one of the switches in the fourth group, illustratively the switch 82, is closed due to selection of the pattern corresponding to the switch 82. A ground level is then provided to the wiper element 30 via the lead 70. If the selected stitch length is within the preferred range of stitch lengths so that the wiper element 30 is contacting the non-conductive area 48, current will flow from the positive voltage source 84 through the resistor 86 to energize the in-range LED 72. However, if the selected stitch length is below the preferred range so that the wiper element 30 contacts the conductive area 50, then current will flow from the positive source 84 through the resistor 88, through the LED 74, through the conductive area 50, and through the wiper element 30 to ground, to thereby energize the below range LED 74. Alternatively, if the selected stitch length is above the preferred range, the wiper element 30 will contact the conductive area 52 and current will then flow from the positive source 84 through the resistor 90, through the LED 76, through the conductive area 52, and through the wiper element 30 to ground, thereby energizing the above range LED 76. The diodes 92 and 94 insure that only one LED is energized at any given time.

Accordingly, there has been disclosed an arrangement for aiding the operator of a multiple pattern sewing machine in selecting an appropriate stitch length. It is understood that the above-described embodiment is merely illustrative of the application of the principles of this invention. Numerous other embodiments may be devised by those skilled in the art without departing from the spirit and scope of this invention, as defined by the appended claims.

I claim:

1. In a multiple pattern sewing machine having means for operator selection of a pattern to be sewn and operator influenced means for adjusting the relative stitch length within a selected pattern, the improvement comprising:

means for defining a preferred range of relative stitch lengths for each of said patterns;

an indicating element which is selectively controllable to assume either a first or a second operator perceivable state; and control means responsive to pattern and stitch length selection for controlling said indicating element, said control means responding to a selected stitch length within the selected pattern preferred range for controlling said indicating element to assume said first state and responding to a selected stitch length outside the selected pattern preferred range for controlling said indicating element to assume said second state.

2. In a multiple pattern sewing machine having means for operator selection of a pattern to be sewn and operator influenced means for adjusting the relative stitch length within a selected pattern, the improvement comprising:

means for defining a preferred range of relative stitch lengths for each of said patterns;

indicator means for communicating with an operator, said indicator means including at least a first indicating element, said first indicating element being selectively energizable to assume an operator perceivable state; and control means responsive to pattern and stitch length selection for controlling said indicator means, said control means responding to a selected stitch length within the selected pattern preferred range for energizing said first indicating element.

3. The improvement according to claim 2 wherein said indicator means further includes a second and a third indicating element and said control means further responds to a selected stitch length being outside of and below the selected pattern preferred range for energizing said second indicating element and responding to a selected stitch length being outside and above the selected pattern preferred range for energizing said third indicating element.

4. The improvement according to claim 2 wherein said stitch length adjusting means includes an adjustment element movable in a plane within a range of positions and said defining means includes a planar surface parallel to the plane of movement of said adjustment element and means on said surface adapted to cooperate with said adjustment element and arranged to present differing characteristics for distinguishing whether said adjustment element is within the preferred range for a selected pattern.

5. The improvement according to claim 4 wherein said means on said surface includes an area of electrically conductive material and said control means includes an electrical contact member disposed on said adjustment element.

6. The improvement according to claim 4 wherein the patterns which may be sewn are divided into a plurality of groups each having a common preferred range of stitch lengths, said means on said surface includes a plurality of areas of electrically conductive material, each corresponding to a respective one of said plurality of groups, and said control means includes a plurality of electrical contact members disposed on said adjustment element each corresponding to a respective one of said groups.

7. The improvement according to claim 2 wherein the patterns which may be sewn are divided into a plurality of groups each having a common preferred range of stitch lengths, said stitch length adjusting means includes an adjustment element movable in a plane within a range of positions, said defining means includes a planar surface parallel to the plane of movement of said adjustment element and a plurality of areas of electrically conductive material on said surface, each of said areas corresponding to either a range of stitch lengths below the preferred range for one of the groups or to a range of stitch lengths above the preferred range for one of the groups, said indicator means further includes a second and a third indicating element, and said control means includes a plurality of electrical contact members disposed on said adjustment element each corresponding to a respective one of said groups and arranged to contact a respective one of said areas of electrically conductive material when said adjustment element sets a stitch length either above or below the preferred range of the respective group, said conntrol means further including means for energizing said first indicating element when the contact member corresponding to the selected pattern is not contacting a conductive area, energizing said second indicating element when the contact member corresponding to the selected pattern is contacting the conductive area corresponding to a range of stitch lengths below the preferred range for the selected pattern, and energizing said third indicating element when the contact member corresponding to the selected pattern is contacting the conductive area corresponding to a range of stitch lengths above the preferred range for the selected pattern.

* * * * *